United States Patent [19]
Sturel

[11] 3,974,454
[45] Aug. 10, 1976

[54] LASER AMPLIFIERS

[75] Inventor: Bernard Sturel, Saint-Cheron, France

[73] Assignee: Compagnie Generale d'Electricite, Paris, France

[22] Filed: Jan. 14, 1975

[21] Appl. No.: 540,763

[30] Foreign Application Priority Data
Feb. 5, 1974  France .................. 74.03796

[52] U.S. Cl. .................. 330/4.3; 331/94.5 E; 331/94.5 C; 350/96 WG
[51] Int. Cl.² .................. H01S 3/05; H01S 3/00
[58] Field of Search .................. 330/4.3; 331/94.5 T, 331/94.5 D, 94.5 E, 94.5 F, 94.5 C; 350/96 WG

[56] References Cited
UNITED STATES PATENTS

| | | | |
|---|---|---|---|
| 3,137,827 | 6/1964 | Pierce | 331/94.5 C |
| 3,153,204 | 10/1964 | Dunsmuir | 331/94.5 T |
| 3,395,366 | 7/1968 | Snitzer et al. | 331/94.5 E |
| 3,428,914 | 2/1969 | Bell | 331/94.5 D |
| 3,530,397 | 9/1970 | Suzuki et al. | 331/94.5 T |
| 3,602,836 | 8/1971 | Young | 330/4.3 |

OTHER PUBLICATIONS

Gans et al., "Immersion Liquids for an Optically . . . Laser," Feb. 12, 1973, pp. 263–266, C. R. Hebd Searces Acad. Sci. B., vol. 276, No. 7.
Gans et al., "Laser Mixture Optiquement Homogene," May 25, 1970, pp. 1343–1346, C. R. Acad. Se. Paris, vol. 270.

Primary Examiner—Nelson Moskowitz
Attorney, Agent, or Firm—Sughrue, Rothwell, Mion, Zinn & Macpeak

[57] ABSTRACT

Laser amplifier of the type comprising a straight cylinder surrounded by a flash, characterized in that the cylinder comprises a first internal portion made of doped glass, having the shape of a cylinder of revolution whose shape is obtained by the rotation about an axis of an arc of a curve turning its convexity towards the axis and a second portion surrounding the first and whose component material is a liquid having an index close to that of the material constituting the first portion.

2 Claims, 3 Drawing Figures

LASER AMPLIFIERS

The invention concerns laser amplifiers, more particularly laser amplifiers in which the active medium is a solid bar, for example made of glass doped with neodymium.

It is known that, to enable a good proper efficiency of such amplifiers, a coherent light beam having a gaussian radial profile is injected at their input.

Indeed, the doped glass absorbs the pumping light according to a decreasing exponential law of the intensity as a function of the radial distance, the centre of the bar being less doped than the surface. If a beam having a gaussian radial profile coming for example from a laser operating in a fundamental transversal mode (TEMoo) is injected at the input of the amplifier, a light beam having an even density of power will be collected at the output of the amplifier.

This mode of operation of laser amplifications has a disadvantage.

Indeed, a radial gaussian beam, diaphragmed by the edges of a circular opening, produces diffraction rings as shown in the article by A.J.K. Campillo, J.E. Pearson, S.L. Shapiro and N.J. Terrel Jr., entitled: "Fresnel diffraction effects in the design of high-power laser system" in Appl. Phys. Letter, Vol 23, No. 2, 15th July, 1973.

These diffraction rings destroy the evenness of the density of power of the beam. Moreover, these rings lead, by the self-focalization effect, to the appearance, at certain parts of the bar, of a very high density of power which could damage the bar.

It was possible to reduce the effects of diffraction due to the sudden dividing of the beam by the opening of the bar by using bars having a greater diameter.

That solution is not perfect; moreover, it increases substantially the volume, hence, the bulk, of the laser amplifier.

The aim of the invention is to produce a laser amplifier in which the detrimental effect of the diffraction is attenuated, without increasing its volume.

The invention has as its object a laser amplifier comprising a cylindrical bar and a source of light power surrounding that bar and capable of illuminating radially, that bar comprising a first internal portion made of doped glass limited by a cylindrical surface of revolution obtained by rotation of an arc of a curve about an axis to curve turning its convexity towards the axis and a second portion surrounding the first, characterized in that the said second portion is constituted by a liquid having a refraction index close to that of the said doped glass, the said bar having the shape of a straight cylinder centered on the said axis, the said bar being capable of amplifying a laser beam crossing through it along the said axis.

By way of an example, when the internal portion is made of glass doped with neodymium, the liquid is a solution of bromoform in ethanol. As a variant, the liquid is dimethylsulfoxyde.

The invention will be well understood from the following description of an embodiment of the invention, with reference to the accompanying drawing, in which:

FIG. 1 is a diagram, as a function of the radial distance r, of the intensity I, of a gaussian beam on its entering a straight cylindrical laser bar.

FIG. 2 is a diagram of the intensity of the same beam at a certain distance inside the bar.

It will be seen that the curve has peaks. As the refraction index of the material of the bar is an increasing function of the light intensity which crosses through it, a self-focalizing phenomenon is started up in the bar, especially in the zones of maximum light intensity and causes, at certain points of the bar, great density of energy which may lead to the destruction of the bar.

Figure 1:
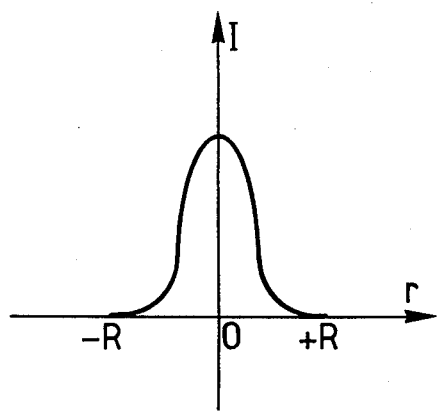
FIG. 1 is a diagram of the intensity I of a gaussian light beam entering a cylindrical bar whose radius is R.
Figure 2:
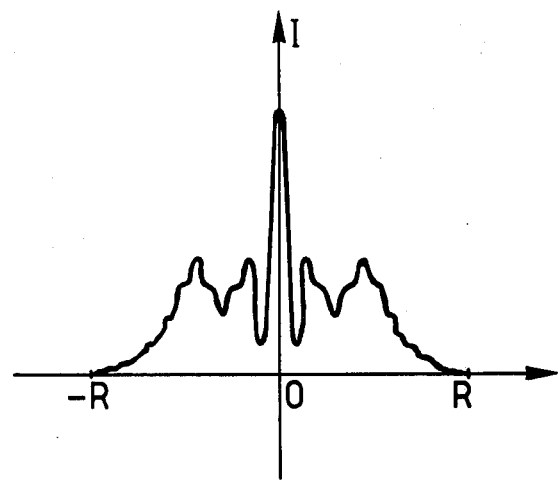
FIG. 2 is a diagram of the intensity I of the same light beam at a certain distance inside the bar.
Figure 3:
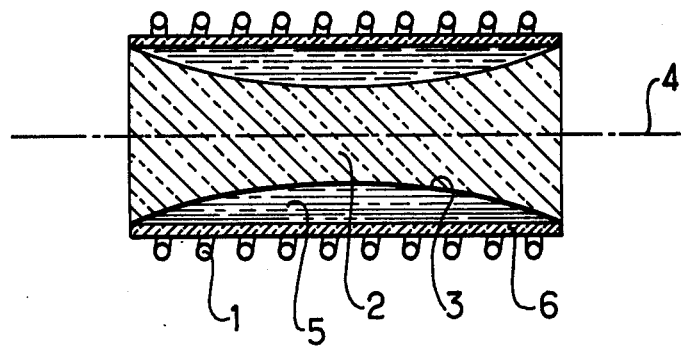
FIG. 3 is an axial cutaway view of a laser bar according to the invention.

FIG. 3 is an axial cutaway view of an amplifier according to the invention.

It has the general shape of a cylinder and is surrounded by a flash 1 of a known type.

The cylinder comprises a portion 2, made of doped glass, having the shape of a cylinder of revolution obtained by the rotation of a curve 3 about an axis 4, the curve 3 turning its convexity towards the axis 4.

A liquid 5, whose refraction index is close to that composing the portion 2 is arranged outside the portion 2. The liquid is kept in place by a tube 6, made of a material transparent to the radiation emitted by the flash, for example glass. The tube is installed in a fluid-tight manner on the portion 2.

If the portion 2 is made of glass doped with neodymium, a liquid having a refraction index close to 1.5, for example a solution of bromoform in ethanol, or dimethylsulfoxyde, will be chosen.

Due to this arrangement, the bar constituted by the portions 2 and 5 has a very low or even zero or negative amplification power (absorption) in the vicinity of its periphery.

In this way, the diffraction phenomenon, aggravating the self-focalization phenomenon is very attenuated, this making the risks of damage or destruction of the device disappear.

I claim:

1. In a laser amplifier comprising an element having the shape of a straight cylinder of revolution about an axis, said element being able to amplify a radial gaussian laser beam crossing through the element along said axis, and a source of light power surrounding said element and capable of radially illuminating the element, the improvement in which said element comprises a first internal portion constituted by a doped glass bar having a shape defined by a revolution surface obtained by rotation of a curve arc about said axis, said curve are turning its convexity towards the axis and stretching from an end to the other end of the element, and a second portion surrounding the internal portion, said second portion constituted by a liquid having a refraction index matching that of the said doped glass, whereby the detrimental effect of the diffraction caused by the passing of the radial gaussian beam through said element is decreased.

2. The improvement according to claim 1 wherein, when said glas bar is doped with neodymium, the liquid constituting the second portion is chosen from among bromoform in a solution with ethanol or with dimethyl sulfoxide.

* * * * *